US012776537B2

(12) United States Patent
Okimoto

(10) Patent No.: US 12,776,537 B2
(45) Date of Patent: Oct. 27, 2026

(54) CYLINDRICAL BATTERY GASKET, METHOD FOR PRODUCING CYLINDRICAL BATTERY USING SAME, AND CYLINDRICAL BATTERY

(71) Applicant: SANYO Electric Co., Ltd., Kadoma (JP)

(72) Inventor: Ryota Okimoto, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 749 days.

(21) Appl. No.: 18/032,606

(22) PCT Filed: Oct. 21, 2021

(86) PCT No.: PCT/JP2021/038932
§ 371 (c)(1),
(2) Date: Apr. 19, 2023

(87) PCT Pub. No.: WO2022/091934
PCT Pub. Date: May 5, 2022

(65) Prior Publication Data

US 2023/0395909 A1 Dec. 7, 2023

(30) Foreign Application Priority Data

Oct. 28, 2020 (JP) ................................ 2020-180061

(51) Int. Cl.
*H01M 50/184* (2021.01)
*F16J 15/06* (2006.01)
(Continued)

(52) U.S. Cl.
CPC .......... *H01M 50/184* (2021.01); *F16J 15/06* (2013.01); *H01M 50/107* (2021.01);
(Continued)

(58) Field of Classification Search
CPC .......... F16J 15/06; F16J 15/061; F16J 15/062; H01M 50/107; H01M 50/152;
(Continued)

(56) References Cited

FOREIGN PATENT DOCUMENTS

| | | |
|---|---|---|
| JP | 6-267516 A | 9/1994 |
| JP | 11-111254 A | 4/1999 |

(Continued)

OTHER PUBLICATIONS

International Search Report dated Dec. 28, 2021, issued in counterpart International Application No. PCT/JP2021/038932 (2 pages).

*Primary Examiner* — Lingwen R Zeng
(74) *Attorney, Agent, or Firm* — WHDA, LLP

(57) ABSTRACT

A gasket is equipped with a cylindrically shaped cylindrical part, and a ring part which extends in a radially inward direction from one end section of the cylindrical part in the axial direction thereof. The cylindrical part has a projecting part which projects in a radially inward direction between both end sections thereof in the axial direction. The projecting part has a first angled section positioned on the ring part side thereof, and a second angled section positioned on the side thereof opposite the ring part, and if a sealing body is placed on the ring part, the first angled section is formed so as not to extend beyond the top surface of the flange section of the sealing body.

7 Claims, 4 Drawing Sheets

(51) Int. Cl.

| | |
|---|---|
| ***H01M 50/107*** | (2021.01) |
| ***H01M 50/152*** | (2021.01) |
| ***H01M 50/167*** | (2021.01) |
| ***H01M 50/186*** | (2021.01) |
| *H01M 50/171* | (2021.01) |

(52) U.S. Cl.
CPC ....... *H01M 50/152* (2021.01); *H01M 50/167* (2021.01); *H01M 50/186* (2021.01); *F16J 15/061* (2013.01); *F16J 15/062* (2013.01); *H01M 50/171* (2021.01); *Y02E 60/10* (2013.01)

(58) Field of Classification Search
CPC ............. H01M 50/167; H01M 50/171; H01M 50/184; H01M 50/186; Y02E 60/10
See application file for complete search history.

(56) References Cited

FOREIGN PATENT DOCUMENTS

| | | | |
|---|---|---|---|
| JP | 2000-260409 | A | 9/2000 |
| JP | 2006-221988 | A | 8/2006 |
| JP | 2012-252922 | A | 12/2012 |

CYLINDRICAL BATTERY GASKET, METHOD FOR PRODUCING CYLINDRICAL BATTERY USING SAME, AND CYLINDRICAL BATTERY

CROSS-REFERENCE TO RELATED APPLICATION

This application is a National Phase Application filed under 35 U.S.C. § 371 of International Application No. PCT/JP2021/038932 filed on Oct. 21, 2021 which claims the benefit of priority under 35 U.S.C. § 119 (a) of Japanese Patent Application No. 2020-180061 filed in Japan on Oct. 28, 2020, the contents of which are incorporated herein by reference.

TECHNICAL FIELD

The present disclosure relates to a gasket for a cylindrical battery, a manufacturing method of a cylindrical battery using the same, and a cylindrical battery.

BACKGROUND ART

A cylindrical battery comprises a bottomed cylindrical exterior can, a sealing assembly closing an opening of the exterior can, and a gasket interposed between the exterior can and the sealing assembly. On the exterior can, a crimped part is formed by bending an edge of the opening inward to fix the sealing assembly to the exterior can via the gasket. There is a case, in a manufacturing step of a cylindrical battery, where the sealing assembly is used in the state of being attached onto the gasket. In order to prevent the sealing assembly from escaping from the gasket before the crimped part is formed, a projection is generally provided on the inner side of the gasket so as to cover a flange of the sealing assembly. For example, PATENT LITERATURE 1 discloses a gasket on which a projection is provided.

CITATION LIST

Patent Literature

PATENT LITERATURE 1: Japanese Unexamined Patent Application Publication No. 2000-260409

SUMMARY

Technical Problem

As to a conventional gasket having a projection, in formation of a crimped part, the edge of the exterior can tends to press the gasket inward and to cause the projection of the gasket to go onto a flange of the sealing assembly. When the projection goes onto the flange of the sealing assembly and is pressed inward in the radial direction of the sealing assembly, a portion, of the gasket, that is other than the projection is stretched by the projection and flows inward in the radial direction of the sealing assembly. This occasionally reduces the thickness of a portion, of the gasket, that comes into contact with the sealing assembly, causing a gap between the gasket and the exterior can. When such a gap arises between the gasket and the exterior can, there is a possibility that the electrolyte solution inside the battery is exuded after expansion and contraction of the gasket are repeated due to changes in ambient temperature.

It is an advantage of the present disclosure to provide a gasket for a cylindrical battery, a manufacturing method of a cylindrical battery using the same, and a cylindrical battery each of which makes a gap between the gasket and the exterior can scarcely arise in formation of a crimped part and is high in sealability.

Solution to Problem

There is provided a gasket for a cylindrical battery according to the present disclosure, the gasket comprising: a cylindrical tubular part: and a circular ring part extending inward in a radial direction from one end of the tubular part in an axial direction, wherein the tubular part has a projection projecting inward in the radial direction between both ends in the axial direction, the projection has a first inclined part positioned on the circular ring part side, and a second inclined part positioned more on a side of the other end of the tubular part in the axial direction than the first inclined part, and the first inclined part is formed at a position that is not to cross over a top surface of a flange of a sealing assembly when the sealing assembly is arranged on the circular ring part.

There is provided a manufacturing method of a cylindrical battery using the gasket according to the present disclosure, the method including the steps of: attaching the gasket onto a sealing assembly such that the sealing assembly is arranged on the circular ring part; arranging the gasket on a grooved part, of a bottomed cylindrical exterior can, that is formed by causing a lateral surface near an opening to project inward; and bending an edge of the opening of the exterior can inward to form a crimped part in such a manner that the gasket is compressed by the exterior can and the sealing assembly.

There is provided a cylindrical battery having the gasket according to the present disclosure, the cylindrical battery comprising: a bottomed cylindrical exterior can; and a sealing assembly arranged on the circular ring part of the gasket, wherein the sealing assembly is crimpedly fixed to the exterior can via the gasket.

Advantageous Effects of Invention

According to the gasket according to the present disclosure, there can be attained a cylindrical battery that makes a gap between the gasket and the exterior can scarcely arise and is high in sealability.

DESCRIPTION OF EMBODIMENTS

Embodiments of a cylindrical battery according to the present disclosure will be hereafter described in detail with reference to the drawings. A cylindrical battery of the present disclosure may be a primary battery or may be a secondary battery. Moreover, it may be a battery using an aqueous electrolyte or may be a battery using a non-aqueous electrolyte. As the cylindrical battery which is an example of the embodiments, there is hereafter exemplarily illustrated a cylindrical battery using a non-aqueous electrolyte (for example, a lithium ion battery), the cylindrical battery of the present disclosure not being limited.

Figure 1:
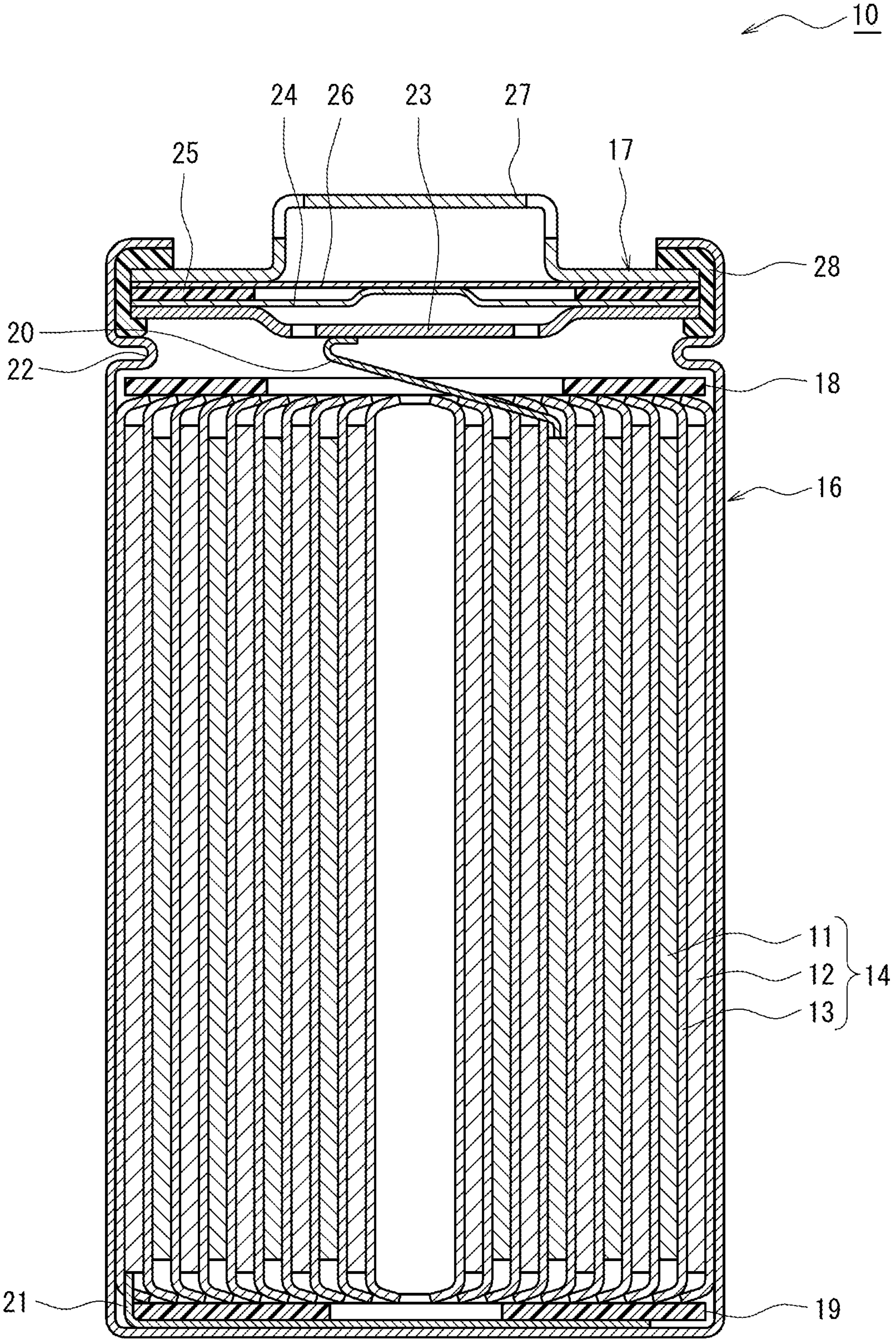
FIG. 1 is a sectional view of a cylindrical battery which is an example of embodiments of the present disclosure.

FIG. 1 is a sectional view of a cylindrical battery 10 as an example of the embodiments. As shown in FIG. 1, the cylindrical battery 10 comprises a winding-type electrode assembly 14, a non-aqueous electrolyte, and an exterior can 16 housing the electrode assembly 14 and the non-aqueous electrolyte. The electrode assembly 14 has a positive electrode 11, a negative electrode 12, and separators 13, and has a winding structure having the positive electrode 11 and the negative electrode 12 wound into a spiral shape via the separators 13. The exterior can 16 is a bottomed cylindrical metal-made container opening on its one side in the axial direction, and the opening of the exterior can 16 is closed by a sealing assembly 17. Hereafter, the sealing assembly 17 side of the battery is regarded as being upward, and the bottom side of the exterior can 16 is regarded as being downward for convenience of description.

Each of the positive electrode 11, the negative electrode 12, and the separators 13 constituting the electrode assembly 14 is a belt-shaped long component, and they are alternately laminated in the radial direction of the electrode assembly 14 by being wound into a spiral shape. In order to prevent lithium from precipitating, the negative electrode 12 is formed to be larger by a certain size than the positive electrode 11. In other words, the negative electrode 12 is formed to be longer in the longitudinal direction and the width direction (transverse direction) than the positive electrode 11. The two separators 13 are formed to be larger by a certain size at least than the positive electrode 11 and, for example, are arranged such that the positive electrode 11 is interposed therebetween. The electrode assembly 14 comprises a positive electrode lead 20 connected to the positive electrode 11 by welding or the like, and a negative electrode lead 21 connected to the negative electrode 12 by welding or the like.

Insulating plates 18 and 19 are arranged on the upside and the downside of the electrode assembly 14, respectively. In the example shown in FIG. 1, the positive electrode lead 20 extends to the sealing assembly 17 side through a through hole of the insulating plate 18, and the negative electrode lead 21 extends to the bottom side of the exterior can 16 via the outside of the insulating plate 19. The positive electrode lead 20 is connected to a lower surface of an internal terminal plate 23 of the sealing assembly 17 by welding or the like, and a cap 27 which is a top board of the sealing assembly 17 electrically connected to the internal terminal plate 23 is a positive electrode terminal. The negative electrode lead 21 is connected to an inner surface of the bottom of the exterior can 16 by welding or the like, and the exterior can 16 is a negative electrode terminal.

A gasket 28 is provided between the exterior can 16 and the sealing assembly 17 and sealability inside the battery is secured. On the exterior can 16, a grooved part 22 is formed by causing a part of the lateral surface to project inward to support the sealing assembly 17. The grooved part 22 is preferably formed to be annular along the circumferential direction of the exterior can 16, and supports the sealing assembly 17 on its upper surface via the gasket 28. The sealing assembly 17 is fixed to an upper part of the exterior can 16 by the grooved part 22 and the opening end, of the exterior can 16, that is crimped with respect to the sealing assembly 17.

The sealing assembly 17 has a structure having the internal terminal plate 23, a lower vent member 24, an insulating member 25, an upper vent member 26, and the cap 27 laminated sequentially from the electrode assembly 14 side. Each of the members constituting the sealing assembly 17 has a disc shape or a ring shape, for example, and the members except the insulating member 25 are electrically connected to one another. The lower vent member 24 and the upper vent member 26 are connected at their centers and the insulating member 25 is interposed between their peripheral edges. When abnormal heat generation causes an internal pressure of the battery to rise, the lower vent member 24 deforms to push the upper vent member 26 upward to the cap 27 side and ruptures, which thereby disconnects a current path between the lower vent member 24 and the upper vent member 26. When the internal pressure further rises, the upper vent member 26 ruptures to discharge gas from an opening of the cap 27.

Figure 2:
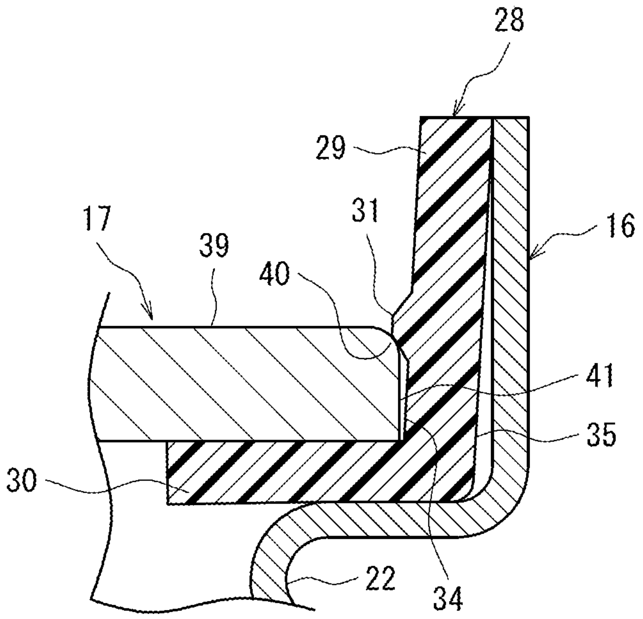
FIG. 2 is a sectional view showing a state where a sealing assembly having a gasket of an embodiment attached is supported on a grooved part of an exterior can.
Figure 3:
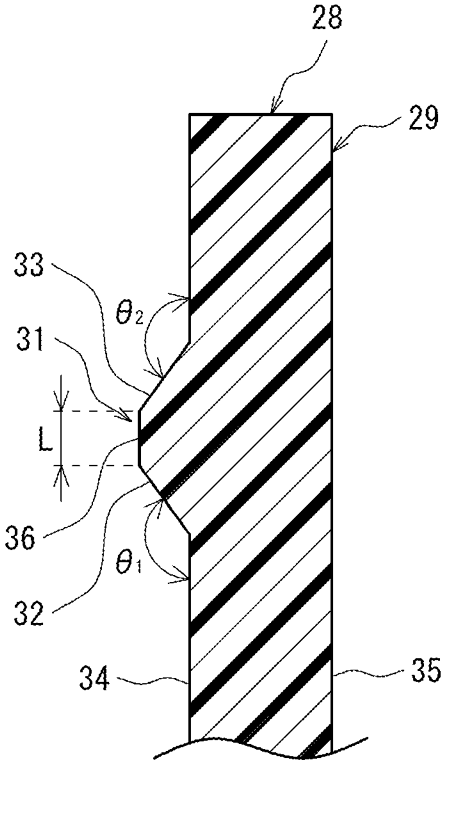
FIG. 3 is a sectional view having the essential part of the gasket of an embodiment expanded.
Figure 4:
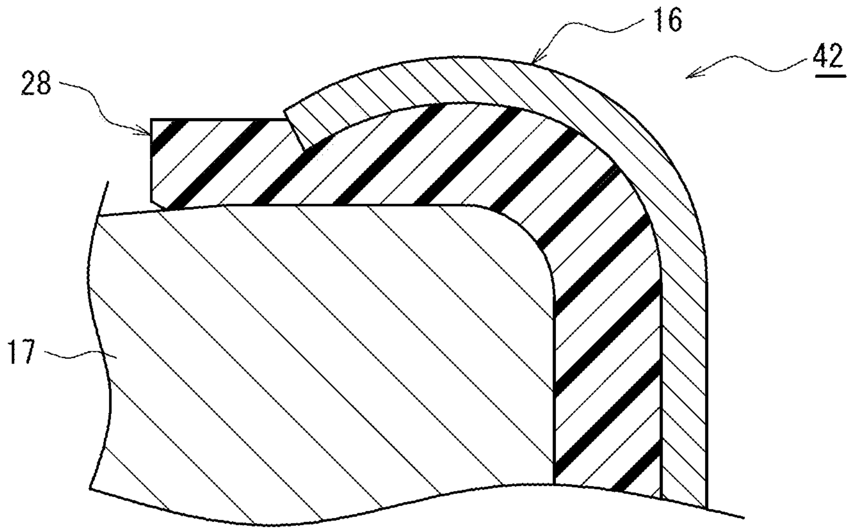
FIG. 4 is a sectional view of a crimped part of a cylindrical battery using the gasket of an embodiment.

Next, referring to FIG. 2 to FIG. 4, the gasket 28 is described. FIG. 2 to FIG. 4 all are sectional views.

FIG. 2 shows a state where the sealing assembly 17 having the gasket 28 attached is supported on the grooved part 22 of the exterior can 16, being a state before a crimped part 42 (refer to FIG. 4) is formed. The gasket 28 is, in the state of being attached onto the sealing assembly 17, in contact with the sealing assembly 17 at a circular ring part 30 and a projection 31 mentioned later. Before the gasket 28 is arranged on the grooved part 22, the gasket 28 can be attached onto the sealing assembly 17 such that the sealing assembly 17 is arranged on the circular ring part 30. The gasket 28 can also be attached onto the sealing assembly 17 by inserting, after arranging the gasket 28 on the grooved part 22, the sealing assembly 17 into the gasket 28. Namely, in a manufacturing method of a cylindrical battery of the present disclosure, there can be swapped a step of attaching the gasket 28 onto sealing assembly 17 and a step of arranging the gasket 28 on the grooved part 22 in terms of their order.

As shown in FIG. 2, the gasket 28 comprises a cylindrical tubular part 29, and the circular ring part 30 extending inward in the radial direction from one end of the tubular part 29 in the axial direction. The tubular part 29 has an inner peripheral surface 34 extending in the axial direction on its inner periphery side, and an outer peripheral surface 35 extending in the axial direction on its outer periphery side. Furthermore, the tubular part 29 comprises the projection 31 projecting inward in the radial direction between both of its ends in the axial direction.

Referring to FIG. 2, the tubular part 29 has a smaller outer diameter than an inner diameter of the exterior can 16, and a larger inner diameter than an outer diameter of the sealing assembly 17. Nevertheless, the size of the tubular part 29 is not limited to these. The inner diameter of the tubular part 29 may be formed to be equal to or slightly smaller than the outer diameter of the sealing assembly 17. In this case, the gasket 28 is attached onto the sealing assembly 17 with the tubular part 29 being spread and widened. The outer diameter of the tubular part 29 may be formed to be approximately equal to the inner diameter of the opening of the exterior can 16 in the state where the gasket 28 is attached onto the sealing assembly 17 so as to enable insertion through the opening of the exterior can 16 onto the grooved part 22.

The circular ring part 30 extends inward in the radial direction of the exterior can 16 and is supported by the grooved part 22. The distal end of the circular ring part 30 extends more inward than the grooved part 22 in the radial direction.

The projection 31 has, on the inner peripheral surface 34, a first inclined part 32 positioned on the downside (circular ring part 30 side), and a second inclined part 33 positioned on the upside (opposite side to the circular ring part 30). Furthermore, the projection 31 may have a flat part 36 along the axial direction of the tubular part 29 between the first inclined part 32 and the second inclined part 33.

The sealing assembly 17 has a top surface 39 and a lateral surface 41 at its flange, and a corner 40 having an R shape is interposed between the top surface 39 and the lateral surface 41 of the flange. The shape shown in the figure is merely exemplary. The corner 40 may have a linear shape. The gasket 28 is attached such that the circular ring part 30 comes into contact with the bottom of the sealing assembly 17 and the projection 31 comes into contact with the corner 40.

The first inclined part 32 is formed so as to be positioned more downward than the top surface 39 of the flange of the sealing assembly 17 when the gasket 28 is attached onto the sealing assembly 17 such that the sealing assembly 17 is arranged on the circular ring part 30. By the first inclined part 32 being positioned more downward than the top surface 39 of the flange of the sealing assembly 17, the projection 31 scarcely goes onto the top surface 39 of the flange of the sealing assembly 17 in formation of the crimped part 42, and there is scarcely formed a gap between the gasket 28 and the sealing assembly 17.

In sectional view, a length, on the inner peripheral surface 34 of the gasket 28, between the first inclined part 32 and the circular ring part 30 is formed to be shorter than a length of the lateral surface 41 of the sealing assembly 17 (length between the bottom surface and the corner 40 of the sealing assembly 17). Furthermore, the first inclined part 32 is formed so as to be positioned lower than the top surface 39 of the flange of the sealing assembly 17. Thereby, when the gasket 28 is attached onto the sealing assembly 17, the first inclined part 32 is to come into contact with the corner 40 in the state of not crossing over the top surface 39 of the flange. Accordingly, the sealing assembly 17 can be prevented from escaping from the gasket 28 before the crimped part 42 is formed.

As shown in FIG. 3, the flat part 36 exists between the first inclined part 32 and the second inclined part 33 to only have a length L along the axial direction of the tubular part 29. Providing the flat part 36 also leads to the effect that, in formation of the crimped part 42, a portion where the gasket 28 comes into contact with the corner 40 scarcely flows to the top surface 39 side of the flange of the sealing assembly 17. Note that in the present disclosure, the flat part 36 is not essential.

In addition to the above, a gap amount between the gasket 28 and the exterior can 16 in formation of the crimped part 42 can be made small by enlarging an angle θ1 (hereinafter referred to as angle 61 of the first inclined part 32) formed by the first inclined part 32 and a portion, of the inner peripheral surface 34 of the tubular part 29, that is adjacent to the first inclined part 32. The reason is that the first inclined part 32 comes into contact with the corner 40 of the sealing assembly 17 to be shaped into the crimped part 42 and that there is attained the effect that the portion where the gasket 28 comes into contact with the corner 40 can be prevented from going onto the top surface 39 of the flange of the sealing assembly 17.

In consideration of the aforementioned effect, the angle θ1 of the first inclined part 32 is preferably formed to be greater than or equal to 130°. The upper limit of the angle θ1 of the first inclined part 32 is set in view of preventing the sealing assembly 17 from escaping. When the angle θ1 of the first inclined part 32 is less than or equal to 175°, the first inclined part 32 is to come into contact with the corner 40 of the sealing assembly 17 when the gasket 28 is attached onto the sealing assembly 17, which can prevent the escape. Accordingly, by forming the angle θ1 of the first inclined part in a range greater than or equal to 130° and less than or equal to 175°, the gap amount of the crimped part 42 can be made smaller than in the case of a conventional gasket. Furthermore, the angle θ1 of the first inclined part 32 is still preferably formed in a range greater than or equal to 150° and less than or equal to 170°. By doing so, there can be effectively prevented the sealing assembly 17 from escaping from the gasket 28 while there can be reduced the gap amount between the gasket 28 and the exterior can 16 in formation of the crimped part 42 to be small.

The second inclined part 33 is formed above the first inclined part 32 (further thereabove in the case where the flat part 36 is provided). An angle θ2 formed by the second inclined part 33 and a portion, of the inner peripheral surface 34 of the tubular part 29, that is adjacent to the second inclined part 33 is 150°, for example.

Notably, each of the first inclined part 32 and the second inclined part 33 is not necessarily formed of a flat surface but may be formed of a curved surface. In this case, in sectional view, the angle θ1 of the first inclined part 32 is defined as an angle, larger than 90°, that is formed by a straight line connecting the end, of the first inclined part 32, that is on the base side on the inner peripheral surface 34 and the other end, of the first inclined part 32, that is on the inner diameter side and the inner peripheral surface 34. The angle θ2 of the second inclined part 33 is also supposed to be defined in the similar manner.

Next, using FIG. 2 and FIG. 4, there is described a mechanism, regarding the gasket 28 of the present embodiment, of a gap scarcely arising between the gasket 28 and the exterior can 16 in formation of the crimped part 42.

As shown in FIG. 2, as to the gasket 28 of the present embodiment, before the crimped part 42 is formed, the first inclined part 32 is positioned more downward than the top surface 39 of the flange of the sealing assembly 17. Thereby, in formation of the crimped part 42, the projection 31 scarcely goes on the top surface 39 of the flange of the sealing assembly 17 and is scarcely pressed inward in the radial direction of the sealing assembly 17. Moreover, when the flat part 36 is formed, in formation of the crimped part 42, the first inclined part 32 and the flat part 36 come into contact with the corner 40 of the sealing assembly 17 so as to go along the same. Thereby, the projection 31 is further scarcely pressed inward in the radial direction of the sealing assembly 17. This reduces an amount of flow of a portion, of the gasket 28, that is other than the projection 31 inward in the radial direction of the sealing assembly 17. Therefore, as shown in FIG. 4, the gasket 28 of the present embodiment attains the effect that, in formation of the crimped part 42, a gap between the gasket 28 and the exterior can 16 scarcely arises.

Moreover, since as to the gasket 28 of the present embodiment, a portion in contact with the corner 40 scarcely flows inward in the radial direction of the sealing assembly 17, the projection 31 comes into contact with the corner 40 of the sealing assembly 17, and it is pressed upward in the direction to the exterior can 16 from the corner 40 by the thickness of the projection 31. Thereby, there is attained an effect that the gap is further restrained from arising.

As described above, using the gasket 28 of the present embodiment, there can be attained the cylindrical battery 10 that makes a gap between the exterior can 16 and the gasket 28 scarcely arise and is high in sealability.

The followings are a method of manufacturing the cylindrical battery 10 using the gasket 28 of the present embodiment described above. First, the gasket 28 is attached onto the sealing assembly 17 such that the sealing assembly 17 is arranged on the circular ring part 30. In this stage, the first inclined part 32 is arranged at a position that does not cross over the top surface 39 of the flange of the sealing assembly 17. Second, the sealing assembly 17 which the gasket 28 is attached onto is arranged on the grooved part 22 formed by causing a lateral surface near the opening to project inward on the bottomed cylindrical exterior can 16. Third, an edge of the opening of the exterior can 16 is bent inward to form the crimped part 42 in such a manner that the gasket 28 is compressed by the exterior can 16 and the sealing assembly 17. As above, the cylindrical battery 10 is manufactured.

According to the manufacturing method of a cylindrical battery using the gasket of the present embodiment, a gap between the exterior can and the gasket scarcely arises in the crimped part. Therefore, the cylindrical battery can be manufactured that is high in sealability.

Further detailed description will be made with examples below, the present disclosure not being limited to these examples.

[Production of Positive Electrode Plate]

As a positive electrode active material. $LiNi_{0.8}Co_{0.15}Al_{0.05}O_2$ was used. One hundred pts, mass of the positive electrode active material, 1.7 pts. mass of polyvinylidene fluoride as a binder agent, and 2.5 pts. mass of acetylene black as a conductive agent were mixed with a dispersion medium to prepare positive electrode mixture slurry. The positive electrode mixture slurry was applied on both surfaces of a positive electrode current collector composed of aluminum foil except on a connection portion for a positive electrode tab and was dried, and after that, the coating films were compressed to have predetermined thicknesses, thereby affording the positive electrode plate. The positive electrode plate was cut to have a predetermined size, and an Al-made positive electrode tab was connected to the exposed part of the current collector by ultrasonic welding.

[Production of Negative Electrode Plate]

As a negative electrode active material, graphite was used. One hundred pts. mass of the negative electrode active material, 0.6 pts. mass of polyvinylidene fluoride as a binder agent, a carboxymethylcellulose as a thickener agent, and an appropriate amount of water were stirred by a double-arm kneader to prepare negative electrode mixture slurry. The negative electrode mixture slurry was applied on both surfaces of a negative electrode current collector composed of copper foil except on a connection portion for a negative electrode tab and was dried, and after that, the coating films were compressed to have predetermined thicknesses, thereby affording the negative electrode plate. The negative electrode plate was cut to have a predetermined size, and a negative electrode tab composed of a Ni—Cu—Ni cladding material was connected to the exposed part of the current collector by ultrasonic welding.

[Preparation of Non-Aqueous Electrolyte Solution]

In a mixed solvent of ethylene carbonate (EC), diethyl carbonate (DEC), and ethyl methyl carbonate (EMC), lithium hexafluorophosphate ($LiPF_6$) as an electrolyte was dissolved in 1.0 mol/L to prepare the non-aqueous electrolyte solution.

[Preparation of Gaskets of Examples]

In order to understand the influence on the gap amount between the exterior can and the gasket, gaskets having different sets of the parameters of the projection were prepared. FIG. 3 shows the parameters. Examples 1 to 4 having different angles θ1 of the first inclined part and different lengths L of the straight line of the flat part were prepared. The angle θ2 of the second inclined part was fixed, being set to 150°. The values of the parameters for Examples 1 to 4 are presented below.

Example 1: θ1=150°, θ2=150°, L=0.05 mm

Example 2: θ1=150°, θ2=150°, L=0.1 mm

Example 3: θ1=170°, θ2=150°, L=0.05 mm

Example 4: θ1=170°, θ2=150°, L=0.1 mm

[Preparation of Gasket of Comparative Example]

Figure 5:
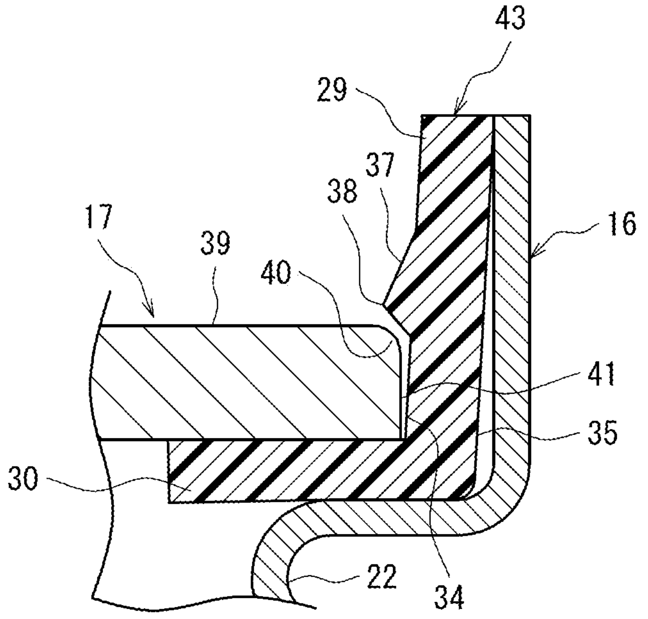
FIG. 5 is a sectional view showing a state where a sealing assembly having a gasket of a comparative example attached is supported on a grooved part of an exterior can.

As a comparative example, a gasket 43 shown in FIG. 5 was prepared. As to the gasket 43 of the comparative example, unlike the gaskets of the examples, a projection 37 was formed such that a part of the lower inclined part of the projection 37 was to cross over the top surface 39 of the flange of the sealing assembly 17 when the sealing assembly 17 was arranged on the circular ring part 30 of the gasket 43. Moreover, on the projection 37, a vertex 38 was formed by directly connecting its upper and lower inclined parts. The values of the parameters are shown below with the angle between the lower inclined part and the inner peripheral surface being set as θ1 and with the angle between the upper inclined part and the inner peripheral surface being set as θ2 as in the examples.

Comparative Example: θ1=120°, θ2=150°

[Production of Cylindrical Battery]

The aforementioned positive electrode plate and negative electrode plate were wound into a spiral shape via polyolefin-based resin microporous films as the separators to produce an electrode assembly. The electrode assembly was inserted into an exterior can produced through drawing processing of a steel plate via a disc-shaped bottom insulating plate, and there were connected the negative electrode tab connected to the negative electrode plate and the exterior can bottom surface together by welding. Next, after an insulating plate was arranged on an upper part of the electrode assembly, a U-shaped grooved part was formed on the lateral surface, of the exterior can, that was at an upper part above the insulating plate in the circumferential direction by plastic processing. After that, a predetermined amount of the prepared non-aqueous electrolyte solution was injected into the exterior can housing the electrode assembly. Then, the positive electrode tab connected to the positive electrode plate was connected to the sealing assembly by welding, the sealing assembly that the gasket was mounted onto was arranged on the grooved part of the exterior can while folding the positive electrode tab, and the edge of the opening of the exterior can was bent inward to form a crimped part in such a manner that the gasket was compressed by the exterior can and the sealing assembly, producing the cylindrical battery.

[Measurement of Gap Amount and Evaluation Result]

Figure 6:
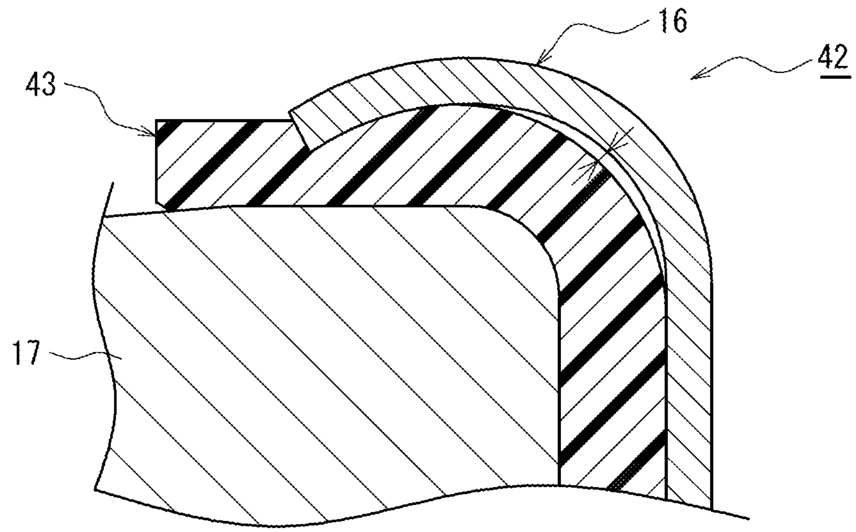
FIG. 6 is a sectional view of a crimped part of a cylindrical battery using the gasket of a comparative example.

For each of Examples 1 to 4 and the comparative example, six cylindrical batteries were produced, and by sectional observation on the sealing assembly, the gap amount of the crimped part was measured. The gap of the crimped part in the comparative example was observed at the position shown in FIG. 6, and the maximum distance of the gap was measured. Moreover, also for each of Examples 1 to 4, as with the comparative example, the maximum distance of the gap was measured. Table I presents, for each of Examples 1 to 4 and the comparative example, an average value of the gap amounts of the crimped parts of the produced cylindrical batteries.

TABLE 1

| | Shape | | | | |
|---|---|---|---|---|---|
| Parameter | Comparative Example | Example 1 | Example 2 | Example 3 | Example 4 |
| θ 1 | 120° | 150° | 150° | 170° | 170° |
| θ 2 | 150° | 150° | 150° | 150° | 150° |
| L | — | 0.05 mm | 0.1 mm | 0.05 mm | 0.1 mm |
| Average value of the gap amount | 0.042 mm | 0.018 mm | 0.011 mm | 0.012 mm | 0.006 mm |

It is apparent that the gap amounts of the crimped parts for Examples 1 to 4 are smaller than the gap amount of the crimped part for the comparative example. The gaskets of the examples are accordingly found to attain the effect to make the gap amount of the crimped part smaller than the gasket of the comparative example. Moreover, it can be confirmed that for the gaskets of the examples, the gap amount decreases by enlarging the angle θ1 of the first inclined part. Moreover, it can also be confirmed that the gap amount decreases by enlarging the length L of the straight line of the flat part.

The smaller gap amount results in better sealability. Accordingly, by enlarging the angle θ1 of the first inclined part, the gap amount decreases and the sealability improves. From the evaluation results, by enlarging the angle θ1 of the first inclined part more than in the case of the comparative example, the gap amount of the crimped part can be made smaller than in the case of the gasket of the conventional example. For example, by forming the angle θ1 of the first inclined part in a range greater than or equal to 130° and less than or equal to 175°, the gap amount of the crimped part can be made small and the sealability can be improved. The angle θ1 of the first inclined part is further preferably set to be greater than or equal to 150° and less than or equal to 170°.

In comparison with the comparative example, it is clear that providing the flat part makes the gap amount smaller and the sealability improves. Moreover, by enlarging the length L of the straight line of the flat part, the gap amount decreases and the sealability improves.

Notably, the present invention is not limited to the aforementioned embodiment and its modifications, and it is needless to say that various alterations and improvements may occur without departing from the matters disclosed in the claims of the present application.

REFERENCE SIGNS LIST

10 cylindrical battery, 11 positive electrode, 12 negative electrode, 13 separator, 14 electrode assembly, 16 exterior can, 17 sealing assembly, 18, 19 insulating plate, 20 positive electrode lead, 21 negative electrode lead, 22 grooved part, 23 internal terminal plate, 24 lower vent member, 25 insulating member, 26 upper vent member, 27 cap, 28, 43 gasket, 29 tubular part, 30 circular ring part, 31 projection, 32 first inclined part, 33 second inclined part, 34 inner peripheral surface, 35 outer peripheral surface, 36 flat part, 37 projection, 38 vertex, 39 top surface, 40 corner, 41 lateral surface, 42 crimped part, θ1 angle of the first inclined part, θ2 angle of the second inclined part

The invention claimed is:

1. A gasket for a cylindrical battery, the gasket being compressed and fixed between a bottomed cylindrical exterior can and a sealing assembly, the gasket comprising:
a cylindrical tubular part; and
a circular ring part extending inward in a radial direction from one end of the tubular part in an axial direction, wherein
the tubular part has a projection projecting inward in the radial direction between both ends in the axial direction,
the projection has a first inclined part positioned on the circular ring part side, and a second inclined part positioned more on a side of the other end of the tubular part in the axial direction than the first inclined part, and
in a state before the sealing assembly is arranged and crimped on the circular ring part, an entirety of the first inclined part is formed so as to be positioned lower than a position of a top surface of a flange of the sealing assembly.

2. The gasket for the cylindrical battery according to claim 1, wherein the first inclined part is formed at a position of coming into contact with a corner interposed between the top surface and a lateral surface of the flange when the sealing assembly is arranged on the circular ring part.

3. The gasket for the cylindrical battery according to claim 1, wherein the projection has a flat part along the axial direction of the tubular part between the first inclined part and the second inclined part.

4. The gasket for the cylindrical battery according to claim 1, wherein an angle formed by the first inclined part and a portion, of an inner peripheral surface of the tubular part, that is adjacent to the first inclined part is greater than or equal to 130° and less than or equal to 175°.

5. A manufacturing method of a cylindrical battery using the gasket according to claim 1, the method including the steps of:
attaching the gasket onto the sealing assembly such that the sealing assembly is arranged on the circular ring part;
arranging the gasket on a grooved part, of the exterior can, that is formed by causing a lateral surface near an opening to project inward; and
bending an edge of the opening of the exterior can inward to form a crimped part in such a manner that the gasket is compressed by the exterior can and the sealing assembly.

6. A cylindrical battery, comprising:
the gasket according to claim 1;
the bottomed cylindrical exterior can; and
the sealing assembly arranged on the circular ring part arranged on the gasket, wherein
the sealing assembly is crimpedly fixed to the exterior can via the gasket.

7. The gasket for the cylindrical battery according to claim 1, wherein, in sectional view of the state before the sealing assembly is arranged and crimped on the circular ring part, a length, on an inner peripheral surface of the gasket, between a lower end of the first inclined part and an upper surface of the circular ring part is formed to be shorter than a length of a lateral surface of the flange of the sealing assembly.

* * * * *